(12) United States Patent
Friedrich et al.

(10) Patent No.: US 8,764,306 B2
(45) Date of Patent: Jul. 1, 2014

(54) MULTI-ROW ROLLING BEARING

(75) Inventors: Peter Friedrich, Auernheim (DE);
Michael Krueger, Schweinfurt (DE);
Steffen Saebsch, Weisendorf (DE);
Heinz Schaefers, Erlangen (DE);
Matthias Fick, Schnaittach (DE);
Manfred Winkler, Aurachtal (DE);
Johannes Enders, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 94 days.

(21) Appl. No.: 13/397,151

(22) Filed: Feb. 15, 2012

(65) Prior Publication Data

US 2012/0207418 A1     Aug. 16, 2012

(30) Foreign Application Priority Data

Feb. 15, 2011  (DE) .......................... 10 2011 004 103

(51) Int. Cl.
*F16C 33/48* (2006.01)
*F16C 43/04* (2006.01)

(52) U.S. Cl.
USPC ............................ 384/572; 384/523; 384/560

(58) Field of Classification Search
USPC .......... 384/560, 572–580, 614, 623, 521–534
See application file for complete search history.

(56) References Cited

U.S. PATENT DOCUMENTS

| 4,783,182 | A | * | 11/1988 | Caron et al. | ................... 384/504 |
| 5,022,768 | A | * | 6/1991 | Baxter | ............................. 384/19 |
| 5,078,243 | A | * | 1/1992 | Kanai et al. | .............. 192/45.016 |
| 2004/0028306 | A1 | * | 2/2004 | Kern et al. | ..................... 384/523 |

FOREIGN PATENT DOCUMENTS

| DE | 100 02 026 A1 | 8/2001 |
| DE | 10 2008 032 027 A1 | 1/2010 |

OTHER PUBLICATIONS

Machine Translation of DE 10002026 Description and Claims, Aug. 9, 2001.*

* cited by examiner

*Primary Examiner* — Alan B Waits
(74) *Attorney, Agent, or Firm* — Simpson & Simpson, PLLC

(57) ABSTRACT

A multi-row rolling bearing, which has a cage for rows of rolling elements that is detachably connected to a respective adjoining cage. For assembly and safety of assembly, the detachable connection between the cages is at least one predetermined breaking point.

4 Claims, 1 Drawing Sheet

MULTI-ROW ROLLING BEARING

CROSS-REFERENCE TO RELATED APPLICATIONS

This application claims priority of DE 10 2011 004 103.6 filed Feb. 15, 2011, which is incorporated by reference herein.

FIELD OF THE INVENTION

The invention concerns a multi-row rolling bearing, which comprises a cage for rolling element row, which is detachably connected to a respective adjoining cage.

BACKGROUND OF THE INVENTION

A rolling bearing of the pre-cited type is described in DE 100 02 026 A1. The disclosed bearing is a radial bearing comprising two rows of cylindrical rolling elements, particularly needle rollers. Each of the two rows comprises a cage for guiding the associated rolling elements as well as a means for a positional fixing of the two cages relative to each other in a pre-assembled state of the bearing. The two cages can be connected directly to each other through a detachable connection which is independent of the remaining bearing components and creates a pre-assembled state of the bearing. The detachable connection of the cages can be configured as a friction-locking clamped joint which permits relative movements, or the connection can also be a positive-engagement connection in form of a plug connection of the bayonet type comprising a snap engagement, or a clip connection. It is further possible to use a glued connection in which the thermal resistance of the glue approximates to zero when an operational value of the bearing temperature is reached.

The purpose of this detachable connection between the cages is to create a relative movability between the cages so that, upon occurrence of tilting moments that can cause a clamping of the rolling elements and, as a result, also torsional torques on the cages, these torques are reduced or completely avoided. Moreover, the detachable connection is also meant to provide the possibility of uniting the cages into a pre-assembled unit with the aim of avoiding errors of assembly.

Multi-row rolling bearings in a bearing arrangement are also described in DE 10 2008 032 027 A1. These bearings are configured as cylindrical roller bearings with the rollers of adjoining rows having different lengths. This known bearing arrangement is an idler pinion bearing which is described in detail in the cited document whose entire content is integrated herewith into the present application as subject matter of the disclosure.

SUMMARY OF THE INVENTION

With this background, it is the object of the invention to propose for a multi-row rolling bearing of the pre-cited type comprising a cage, which is detachably connected to a respective adjoining cage, where the a detachable connection can be manufactured in a simple and economic manner and reliably handled as a pre-assembled structural unit, but which is also easily separable.

To achieve this object, the detachable connection between the cages of the present invention is at least one predetermined breaking point.

This type of separable connection is important for the fabrication and assembly by the manufacturer but, above all, the connection is important during transportation and assembly by the user. In a subsequent case of operation or use, the connection can be separated in a simple manner, in order to achieve, for example, an enhanced durability. The separation of the connection after assembly can occur either actively by separating the cages at the at least one predetermined breaking point, or in a passive manner.

The at least one predetermined breaking point is dimensioned so that the cages constitute a manageable pre-assembled unit. The passive separation of the connection can be achieved by the at least one predetermined breaking point fracturing during operation of the rolling bearing due to loading, which permits relative movements between the cages.

In this way, the difficulties encountered during assembly when two or more single row cages are used are avoided. The fact is that, if the individual cages do not adhere to one another, and can therefore fall apart, problems and errors can occur. In particular, errors of assembly in the case of cages comprising differently dimensioned and/or configured rolling elements. This is avoided through the inventive configuration of the cages with a connection comprising at least one predetermined breaking point.

The cages can be made out of a metal or a plastics material. When the cages are made out of metal, the cages can be manufactured together with rolling element pockets and predetermined breaking points by a machining method. The cages can also be manufactured as plastic injection molded parts so that the rolling element pockets and predetermined breaking points are already made when the cages are removed from the injection molding die.

It is however also possible to configure the predetermined breaking point as at least one clip hooked into axially adjoining empty pockets of the two cages or as at least if) one retaining strip or retaining ring or the like that connects the two cages to each other.

BRIEF DESCRIPTION OF THE DRAWINGS

The rolling bearing configured according to the invention will be described more closely in the following in three embodiments and with reference to the appended drawings.

DETAILED DESCRIPTION OF THE INVENTION

Figure 1:
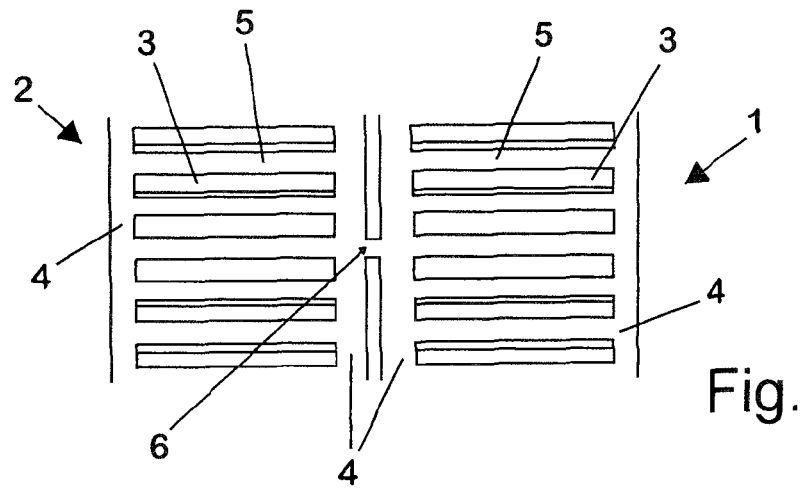
FIG. 1 shows two needle roller bearing cages connected through at least one predetermined breaking point for use with cylindrical needle rollers of identical lengths.

FIG. 1 shows a partial view of a cage arrangement for a two-row needle roller bearing. The cage arrangement comprises a first cage 1 and a second cage 2 whose rolling element pockets 3 are configured between a pair of side rings 4 and cross-webs 5 connecting the side rings 4 to each other. The two cages 1, 2 are connected to each other through at least one predetermined breaking point 6 and, when pre-assembled into a unit, these cages can be filled with needle-shaped rolling elements, not illustrated. In this way, a pre-assembled structural unit is obtained which can be safely handled during assembly of the rolling bearing.

The connection of the two cages 1, 2 at the at least one predetermined breaking point 6 can be disengaged either actively by separating the predetermined breaking point after assembly, or the separation can occur passively if the predetermined breaking point 6 is dimensioned, for example, such that the cages 1, 2 for mounting the rolling bearing constitute a manageable pre-assembled unit, but the at least one predetermined breaking point 6 fractures during operation of the rolling bearing due to the then occurring loads and permits relative movements between the cages 1, 2. Appropriately, the disruption of the predetermined breaking point is effected without residue, i.e. without a release of freely movable broken pieces.

Figure 2:
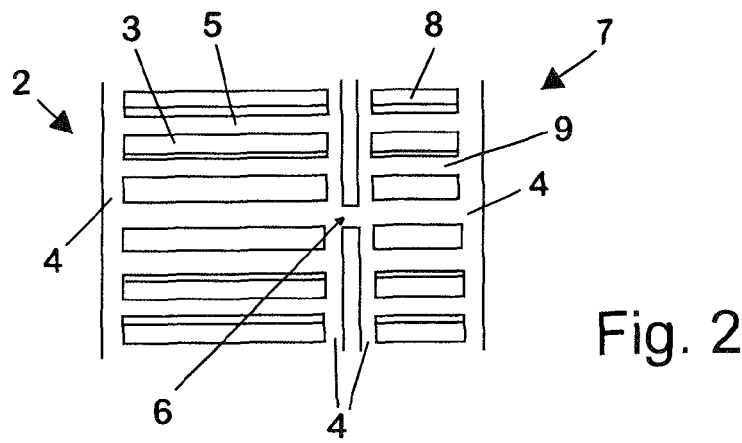
FIG. 2 shows two cages connected through at least one predetermined breaking point, comprising rolling element pockets for cylindrical needle rollers of different lengths.

The cage arrangement illustrated in FIG. 2 comprises a first cage 2 that is similar to the one in FIG. 1, and a second cage 7 which, again, is connected to the first cage 2 through at least one predetermined breaking point 6. The cross-webs 9 connecting the side rings 4 of the second cage 7 are shorter than the cross-webs 5 of the cages shown in FIG. 1 so that the rolling element pockets 8 are also correspondingly shorter and, thus, serve to receive shorter rolling elements than those inserted into the rolling element pockets 3. This cage arrangement is of the type illustrated, for example, in FIG. 2 of DE 10 2008 032 027 A1.

Figure 3:
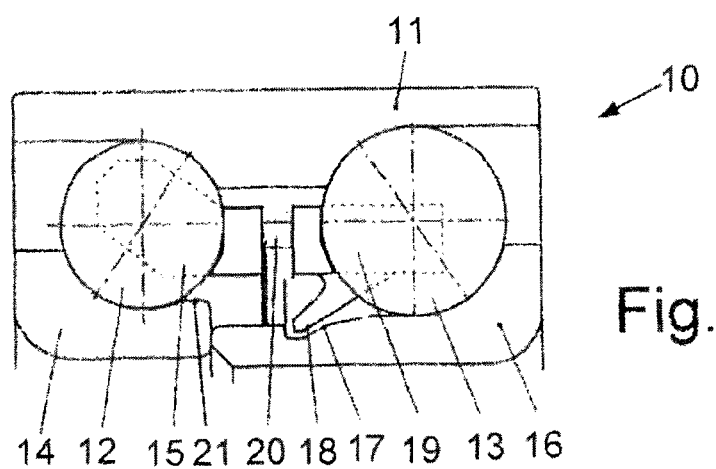
FIG. 3 shows a two-row angular contact ball bearing whose cages are connected to each other through at least one predetermined breaking point.

Because the invention is not limited to multi-row roller bearings, particularly needle roller bearings as shown in FIGS. 1 and 2, FIG. 3 shows a two-row angular contact ball bearing like the one illustrated and described in DE 40 34 270 A1. The two-row angular contact ball bearing 10 comprises a common outer ring 11, which surrounds two rows of balls 12, 13 radially on the outside. The left-hand side row 12 in the drawing comprises smaller balls. An inner ring 14 associated to these balls comprises a counter raceway for the ball row 12 that is guided through a prong-type cage 15. In the region of the second row of rolling elements 13 comprising the larger balls, is arranged an inner ring 16 having a rolling element raceway with a smaller diameter. This inner ring 16 is configured with a groove 17 into which a slanting, inclined retaining projection 18 of the prong-type cage 19 is snapped.

The two cages 15, 19 are connected to each other through at least one predetermined breaking point 20 which, as already described, can fracture actively or passively. A shoulder 21 on the first inner ring 14, the retaining projection 18 snapped into the groove 17 of the second inner ring 16 and the predetermined breaking point 20 together form the two-row angular contact ball bearing 10 in form of a pre-assembled and manageable structural unit which provides a great simplification of assembly of the individual parts which cannot be confused with one another.

After the fracture of the predetermined breaking points 6, 20, the cages 1, 2, 7, 13, are freely movable relative to each other, so that tilting moments are reduced or completely avoided. In this way, the inventive multi-row rolling bearing can be easily adapted to every specific case of use and, in addition to the improved safety of assembly, leads to an enhanced durability.

LIST OF REFERENCE NUMERALS

1 First Cage
2 Second, Axially Longer Cage
3 Rolling Element Pocket
4 Side Rings
5 Cross-Webs
6 Predetermined Breaking Point
7 Second, Axially Shorter Cage
8 Rolling Element Pocket
9 Cross-Webs
10 Two-Row Angular Contact Ball Bearing
11 Outer Ring
12 Bali Row
13 Ball Row
14 First Inner Ring
15 Prong-Type Cage
16 Second Inner Ring
17 Groove.
18 Retaining Projection
19 Prong-Type. Cage
20 Predetermined Breaking Point
21 Shoulder

What is claimed:

1. A multi-row rolling bearing, comprising:
a first cage for at least one row of rolling elements; and
a second cage for at least one row of rolling elements, the first cage being detachably connected to the second cage by a detachable connection,
wherein the first cage, the second cage, and the detachable connection are formed as one continuous single piece, and the detachable connection is a retaining strip that extends axially between the first cage and the second cage and comprises at least one predetermined breaking point, the retaining strip having a constant radial thickness over an entire length of the retaining strip, where the radial thickness is measured in a radial direction of the bearing, and
wherein the retaining strip is inset from inner and outer radial surfaces of at least one of the first cage and the second cage.

2. The rolling bearing according to claim 1, wherein the first cage and the second cage for mounting of the rolling bearing form a pre-assembled unit.

3. The rolling bearing according to claim 1, wherein the first cage, the second cage, and the detachable connection are plastic injection molded parts.

4. The rolling bearing according to claim 1, wherein the rolling elements of the first cage are dimensioned differently and/or shaped differently from the rolling elements of the second cage.

* * * * *